(12) United States Patent
Grubwinkler et al.

(10) Patent No.: US 11,787,406 B2
(45) Date of Patent: Oct. 17, 2023

(54) OPERATING A CONTROL DEVICE OF A MOTOR VEHICLE IN ORDER TO PREDICT A NEXT STOPPING PROCEDURE

(71) Applicant: Vitesco Technologies GmbH, Hannover (DE)

(72) Inventors: Stefan Grubwinkler, Munich (DE); Friedrich Graf, Munich (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 551 days.

(21) Appl. No.: 16/768,592

(22) PCT Filed: Nov. 29, 2018

(86) PCT No.: PCT/EP2018/083033
§ 371 (c)(1),
(2) Date: May 29, 2020

(87) PCT Pub. No.: WO2019/106100
PCT Pub. Date: Jun. 6, 2019

(65) Prior Publication Data
US 2021/0171040 A1    Jun. 10, 2021

(30) Foreign Application Priority Data

Dec. 1, 2017 (DE) ...................... 10 2017 221 633.6

(51) Int. Cl.
*G08G 1/095* (2006.01)
*B60W 30/18* (2012.01)
*G01C 21/36* (2006.01)

(52) U.S. Cl.
CPC ............... *B60W 30/18109* (2013.01); *B60W 30/18018* (2013.01); *B60W 30/18072* (2013.01);
(Continued)

(58) Field of Classification Search
CPC ..... B60W 30/18109; B60W 30/18018; B60W 30/18072; G08G 11/095
See application file for complete search history.

(56) References Cited

U.S. PATENT DOCUMENTS 9,759,573 B2 *   9/2017 Meyer ................ G01C 21/3469
2011/0005486 A1   1/2011 Nakamura ................ 123/179.4
(Continued)

FOREIGN PATENT DOCUMENTS

DE    10 2011 004 425        2/2011 ............ B60W 40/04
DE    102011004425 A1 *   8/2012 ............ B60W 40/04
(Continued)

OTHER PUBLICATIONS

Chinese Office Action, Application No. 201880077718.7, 16 pages.
(Continued)

*Primary Examiner* — Vivek D Koppikar
*Assistant Examiner* — Jeffrey R Chalhoub
(74) *Attorney, Agent, or Firm* — Slayden Grubert Beard PLLC

(57) ABSTRACT

Various embodiments include methods for operating a motor vehicle during a journey along a route comprising: determining an upcoming potential stopping point along the route; upon approach to the potential stopping point, calculating a value for a probability of a stopping procedure of the motor vehicle at the stopping point at least in part on a stopping model; and, if the probability value is in a predetermined range of values defining a likely occurrence of the stopping procedure, triggering a predetermined operating measure to adapt operation of the motor vehicle to the stopping procedure. The stopping model includes a statistical model providing intermediate values between 0% and 100% for the probability value.

21 Claims, 6 Drawing Sheets

(52) U.S. Cl.
CPC ......... *G01C 21/3605* (2013.01); *G08G 1/095* (2013.01); *B60W 2510/18* (2013.01)

(56) References Cited

U.S. PATENT DOCUMENTS

| | | | |
|---|---|---|---|
| 2014/0335994 A1 | 11/2014 | Hirotada | B60W 20/00 |
| 2019/0001985 A1 | 1/2019 | Jerger | B60W 30/18 |
| 2020/0156641 A1* | 5/2020 | Kretschmann | B60W 30/18 |

FOREIGN PATENT DOCUMENTS

| | | | |
|---|---|---|---|
| DE | 10 2015 212 027 | 6/2015 | ............... G08G 1/01 |
| DE | 102015008423 A1 | 1/2017 | .......... B60W 30/182 |
| DE | 102015219232 B3 | 4/2017 | ............... B60H 1/00 |
| EP | 1890110 A2 | 2/2008 | ............. G01C 21/34 |
| EP | 2 781 722 | 11/2011 | ............. F02D 29/02 |
| FR | 3048667 A1 | 9/2017 | |
| WO | 2008/113836 A1 | 9/2008 | ........... B60W 10/06 |
| WO | 2017 097914 | 12/2015 | ............ B60W 30/18 |

OTHER PUBLICATIONS

Search Report for International Application No. PCT/EP2018/083033, 12 pages.
Emmanouil Koukoumidis et al., "SignalGuru: Leveraging Mobile Phones for Collaborative . . . " 14 pages.
Office Action for German Patent Application No. 10 2017 221 633.6. 7 pages.
Chinese Office Action, Application No. 201880077718.7, 14 pages.

\* cited by examiner

OPERATING A CONTROL DEVICE OF A MOTOR VEHICLE IN ORDER TO PREDICT A NEXT STOPPING PROCEDURE

CROSS-REFERENCE TO RELATED APPLICATIONS

This application is a U.S. National Stage Application of International Application No. PCT/EP2018/083033 filed Nov. 29, 2018, which designates the United States of America, and claims priority to DE Application No. 10 2017 221 633.6 filed Dec. 1, 2017, the contents of which are hereby incorporated by reference in their entirety.

TECHNICAL FIELD

The present disclosure relates to operation of a vehicle. Various embodiments of the teachings herein may include methods for operating a control device of a motor vehicle during a journey along a route to check whether the motor vehicle will also actually stop at an upcoming potential stopping point during the current journey, control devices, and/or motor vehicles having a control device.

BACKGROUND

The prediction or forecasting of a stopping procedure can be used in a motor vehicle to adjust its operation for the upcoming stopping procedure even before the stopping procedure begins so that unnecessary intervention by friction brakes in order to brake the motor vehicle can be prevented, for example, if the motor vehicle could also coast to a stop, for example, in the event of a known imminent stopping procedure.

In connection with the forecasting of a stopping procedure at a red traffic light, the scientific publication by Koukoumidis et al. (Emmanouil Koukoumidis, Li-Shivan Peh, Margaret Mardonosi, "SignalGuru: Leveraging Mobile Phones for Collaborative Traffic Signal Schedule Advisory", MobiSys 2011, Bethesda, Md., USA) discloses a method in which traffic lights of a road network are filmed using a plurality of motor vehicles in order to thereby determine their traffic light phases (red phase and green phase). A model which simulates the duration of the traffic light phases is configured for each traffic light. Each model indicates whether the respective traffic light currently has a red phase or a green phase.

In addition, the duration of the respective traffic light phase can be indicated. In order to synchronize the switching phases of the model of a traffic light with its actual switching phases, a switching procedure of the traffic light must be filmed by a motor vehicle so that the associated model can then be synchronized with the traffic light in terms of time. If, in contrast, a model is currently not synchronized with the associated traffic light, the model cannot be used. In addition, a motor vehicle is instructed to synchronize its model of a traffic light with a motor vehicle traveling in front which reports the switching procedure which is used for synchronization. In addition, the method is restricted to the forecasting of switching times at traffic lights.

SUMMARY

The present disclosure described various systems and methods for adapting the operation of a motor vehicle with respect to an imminent possible stopping procedure. For example, some embodiments include a method (23) for operating a control device (11) of a motor vehicle (10) during a journey along a route (16), wherein at least one upcoming potential stopping point (25, 32, 33, 34) along the route (16) is determined, and, as the respectively determined potential stopping point (25, 32, 33, 34) is approached, a probability value (28) for a probability of a stopping procedure of the motor vehicle (10) at the stopping point (25, 32, 33, 34) is determined on the basis of a stopping model (21), characterized in that the control device (11) manages, as the stopping model (11), a statistical model which also provides intermediate values between 0% and 100% for the probability value and, if the probability value (28) is in a predetermined range of values (29) defining the likely occurrence of the stopping procedure, triggers at least one predetermined operating measure (30) which is respectively configured to adapt operation of the motor vehicle (10) to the stopping procedure.

In some embodiments, an intersection with right-of-way control and/or a traffic circle and/or a stop sign and/or a traffic light (26) and/or an on-ramp and/or a barrier and/or a parking garage entrance is/are respectively determined as at least one potential stopping point (25, 32, 33, 34).

In some embodiments, at at least one stopping point (34) along the route (16), at least one reference event (37) which precedes the reaching of the stopping point (34) in terms of time is detected by the control device (11), and the probability value (28) is determined by means of the stopping model (21) on the basis of the at least one detected reference event (37).

In some embodiments, the at least one reference event (37) is a starting procedure at an earlier stopping point (32) with a traffic light (36).

In some embodiments, the respective probability value (28) is determined by means of the stopping model (21) on the basis of traffic information and/or a respective indication of a time and/or a time of day and/or a day of the week and/or a season and/or a schedule change of a traffic light.

In some embodiments, the stopping model (21) is at least partially trained by virtue of the fact that a driving operational state (15), which distinguishes between stopping of the motor vehicle (10) and a passage of the motor vehicle (10), is detected in the motor vehicle (10), during at least one earlier journey (31), for at least one potential stopping point (32, 33, 34), upon reaching the respective stopping point (32, 33, 34), and the stopping model (21) is adapted on the basis of the detected driving operational state (15).

In some embodiments, a driving operational state (15) which is determined at a stopping point (32, 33, 34) and was determined in a traffic jam situation is rejected.

In some embodiments, the stopping model (21) is at least partially trained by virtue of the fact that the control device (11) is coupled to at least one data source outside the vehicle and receives model data (47) from at least one other motor vehicle from the at least one data source and/or receives model data (47) relating to an overall model (44) from a server (20) and configures the stopping model (21) using the received model data (47).

In some embodiments, the at least one operating measure (30) comprises operating a drive train of the motor vehicle (10) in a coasting mode and/or a drag mode and/or a recuperation mode and/or switching off an internal combustion engine (12) of the motor vehicle (10).

In some embodiments, a confidence value is also determined in addition to the probability value (28) by means of the stopping model (21), wherein the confidence value indicates a degree of correspondence between the stopping model (21) and a current driving situation, and the at least one operating measure (30) is initiated only if the confidence value is in a predetermined confidence range (28').

In some embodiments, a duration value is additionally determined for the respective stopping procedure by means of the stopping model (21), wherein the duration value indicates how long the motor vehicle (10) will presumably still be at a standstill during the stopping procedure, and at least one predetermined starting measure is started by the control device (11) on the basis of the duration value.

In some embodiments, the at least one starting measure comprises starting a switched-off internal combustion engine (12) of the motor vehicle (10).

In some embodiments, at least one upcoming potential stopping point (25, 32, 33, 34) in at least one earlier journey of the motor vehicle (10) and/or of at least one other motor vehicle (38) is respectively determined where the respective motor vehicle (10, 38) has already carried out at least a predetermined minimum number of stopping procedures.

As another example, some embodiments include a control device (11) for a motor vehicle (10), wherein the control device (11) has a computing device (22) which is configured to carry out a method (23) as described herein.

As another example, some embodiments include a motor vehicle (10) having a control device (11) as described herein.

BRIEF DESCRIPTION OF THE DRAWINGS

Various embodiments of the teachings herein are described below. In the figures.

DETAILED DESCRIPTION

Figure 1:
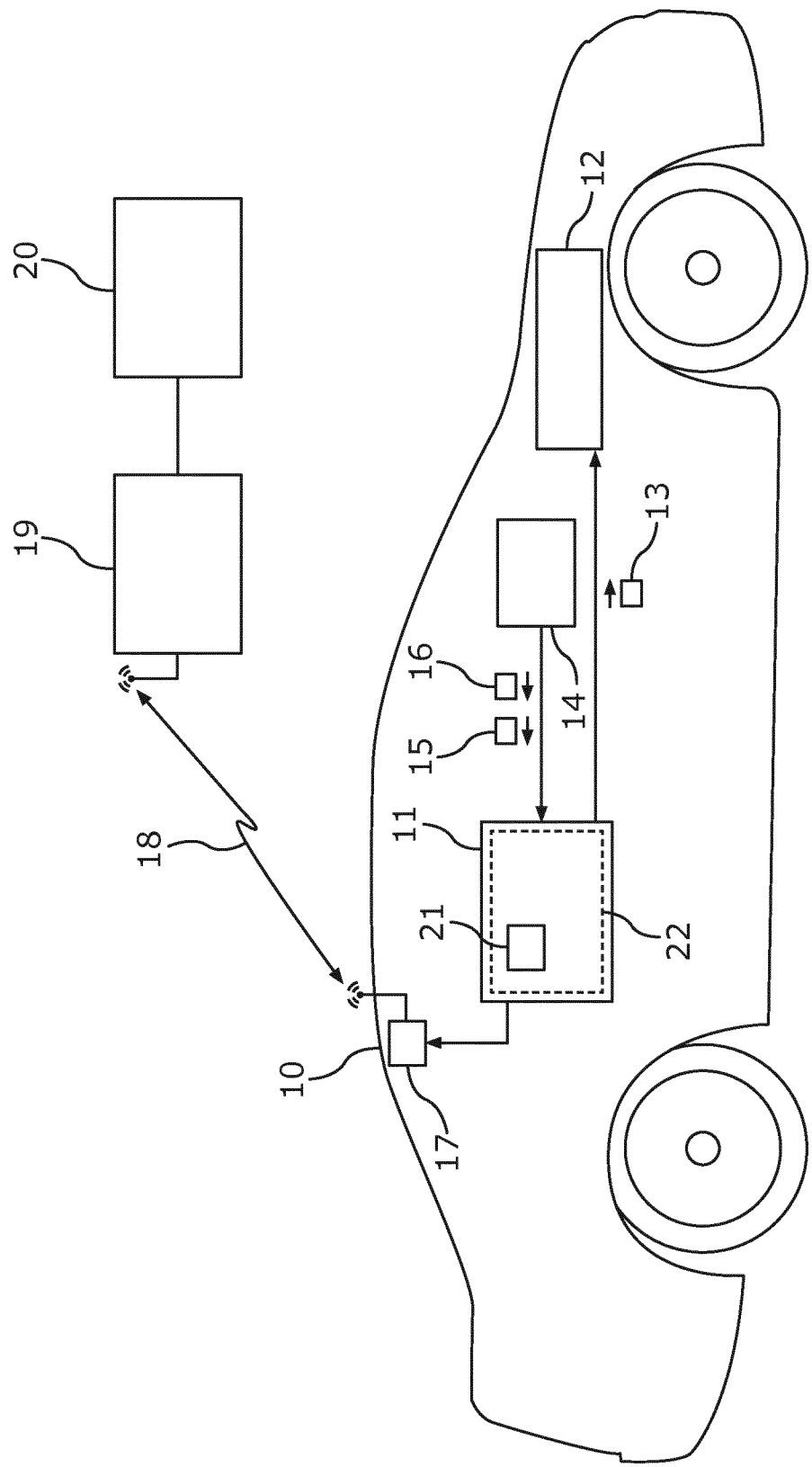
FIG. 1 shows a schematic illustration of one embodiment of a motor vehicle incorporating teachings of the present disclosure.

The teachings of the present disclosure describe and enable systems and methods for operating a control device of a motor vehicle. Various embodiments of the control device may be in the form of a control unit of the motor vehicle, for example. The methods provide for the operation of a control device during a journey of the motor vehicle along a route. For example, the route may run along a road network. The route may be a planned route read from a navigation system of the motor vehicle or an estimated route.

In some embodiments, at least one upcoming potential stopping point along the route is now determined, that is to say a point at which there is the possibility of the motor vehicle stopping. Such a potential stopping point can be stored or mapped in a digital map of the motor vehicle, for example. As the respectively determined potential stopping point is approached, the control device determines a probability value for a probability of the motor vehicle carrying out a stopping procedure at the stopping point, that is to say actually stopping or coming to a standstill. The probability value is determined on the basis of a stopping model.

In some embodiments, the control device manages, as the stopping model, a statistical model which also provides intermediate values between 0% and 100% for the probability value. If the probability value is then in a predetermined range of values, the control device triggers at least one predetermined operating measure. The at least one predetermined operating measure is respectively configured to adapt operation of the motor vehicle to the stopping procedure. For example, such an operating measure can be configured to reduce and preferably minimize a fuel consumption of the motor vehicle caused by the stopping procedure. A further operating measure may be the targeted control of at least one auxiliary consumer. For example, the power of an electrical cooling compressor can be increased in order to efficiently use the energy available as a result of a recuperation mode. The predicted stopping procedure can generally be used for any function and/or vehicle component in order to increase the comfort or efficiency.

Said checked range of values therefore defines the likely occurrence of the stopping procedure, that is to say it indicates all those probability values for which it is assumed that the stopping procedure will actually occur. In other words, it is assumed that the stopping procedure actually occurs if the probability value determined by means of the stopping model is in the predetermined range of values. For this situation, at least one operating measure is then triggered and is used to prevent fuel from being unnecessarily consumed in the motor vehicle. For example, coasting of the motor vehicle to the stopping point may be provided instead of continuing to drive the motor vehicle with engine power in order to then brake it using a friction brake. The range of values preferably has an upper limit of 100% and a lower limit in a range from 50% to 90%.

In some embodiments, fuel can also be allowed during a stopping procedure at those stopping points which are not switched by a traffic light, for example, but rather are forced by a traffic volume, for example, or on account of an unclear situation. If a motor vehicle also stops here regularly, this can be represented or simulated in the statistical model which is used as the stopping model. In this case, a variance or irregularity can be compensated for by means of the stopping model by virtue of a probability value being determined rather than a binary statement (stopping: yes or no) being generated The stopping model can indicate an individual probability value for at least one potential stopping point, for example.

The probability value can be determined by observing the driving behavior at the stopping point and can indicate the ratio of actual stopping procedures to the total number of observations. The stopping model can also provide a probability distribution for at least one potential stopping point, which probability distribution can respectively indicate a probability value for different arrival times at the stopping point. However, the stopping model can nevertheless be used in the same manner or adapted in deterministically predefined stopping procedures, for example at a traffic light or at a stop sign, with the result that such a stopping point can also be taken into account by the stopping model.

In some embodiments, if the likely occurrence of the stopping procedure is detected (probability value within the range of values), the at least one operating measure is initiated, that is to say the operation of the motor vehicle is adapted to the stopping procedure, by reducing, for example, the fuel consumption which results during the stopping procedure by means of the at least one operating measure (in comparison with an omission of the operating measure), with the result that the operation of the motor vehicle can take place efficiently despite the stopping procedure.

In some embodiments, a method incorporating the teachings herein can be applied to a multiplicity of different stopping points.

Some embodiments provide for an intersection with right-of-way control and/or a traffic circle and/or a stop sign and/or a traffic light and/or an on-ramp (for example onto a freeway) and/or a barrier and/or a parking garage entrance to be respectively determined as at least one potential stopping point. However, this list should be considered merely exemplary.

For each of these stopping points mentioned, the stopping model may provide a statistical description which indicates or provides a probability value for a stopping procedure at the respective stopping point. If the motor vehicle then approaches the respective stopping point, the probability value for a stopping procedure can be determined for the stopping point by means of the stopping model. It is then possible to decide whether the at least one predetermined operating measure should be triggered (probability value within the stated range of values). In some embodiments, the at least one operating measure can be triggered at a location at which a stopping procedure of the motor vehicle can regularly result.

In some embodiments, in the case of a stopping point for which the fact of whether a stopping procedure will actually occur depends on a circuit (for example a traffic light circuit or a barrier circuit), the stopping model may be synchronized with the circuit at this stopping point. Unlike in the prior art, however, an attempt is not made here to observe the stopping point itself, that is to say the traffic light or barrier provided there, for example.

Rather, in some embodiments, for a stopping point along the route, for at least one reference event which precedes the reaching of the stopping point in terms of time to be detected by the control device. The probability value relating to the stopping procedure at the stopping point in question is then determined by means of the stopping model on the basis of the at least one detected reference event. The reference event therefore does not take place at the stopping point in question itself, but rather along the route before this stopping point. In other words, the motor vehicle first of all passes the at least one reference event and only then reaches the stopping point.

In some embodiments, the reference event is correlated in terms of time with the circuit at the stopping point, that is to say with the traffic light circuit or the barrier circuit, for example. If the reference event occurs or is observed, the switching phase of the circuit at the stopping point is known without the circuit at the stopping point itself having to have been observed in this case by another motor vehicle traveling in front. On the basis of the at least one reference event, the stopping model can determine the switching phase of the upcoming stopping point in question itself (that is to say the traffic light switching phase, for example) and can determine a probability value of a stopping procedure for the likely arrival time at the stopping point. In such embodiments, the stopping model can be adapted or adjusted to the current driving situation by detecting the at least one reference event.

In some embodiments, a reference event is the entry to or exit from a garage. When exiting the garage, the user of the motor vehicle may be in the habit of first of all driving out of the garage and then stopping the motor vehicle again at a stopping point in front of the garage in order to close the garage door. The at least one operating measure can then be triggered for this stopping point. The other way round, when entering the garage, the user of the motor vehicle may be in the habit of stopping in front of the garage in order to get out and open the garage. The subsequent stopping point is then in the garage, for which the at least one operating measure can be triggered once already when entering the garage. For example, for these reference events mentioned, it is possible to dispense with starting an internal combustion engine because the route can be covered using an electrical additional drive of the motor vehicle.

In some embodiments, a reference event includes a starting procedure at an earlier stopping point with a traffic light. The reference event is the starting of the motor vehicle when the traffic light switches to the green phase. If the driving duration which is required by the motor vehicle to travel from this stopping point to the next stopping point, at which a traffic light can then be provided again, is now also taken into account, the stopping model can be synchronized with this traffic light at the next stopping point if the two traffic lights mentioned have correlated switching phases. For example, a so-called green wave can be used along the route.

In some embodiments, the respective probability value for the at least one potential stopping point to be determined by means of the stopping model on the basis of traffic information and/or a respective indication of a time and/or a time of day (for example morning, midday, afternoon, evening, night) and/or a day of the week (for example Monday, Tuesday, . . . Saturday, Sunday) and/or a season (for example winter or spring or summer or autumn) and/or a schedule change of a traffic light (peak traffic, off-peak traffic). In other words, the stopping model is dynamic and is adapted to the respective prevailing or present boundary condition (traffic situation and/or time and/or switching scheduling of the traffic light). As a result, the stopping model can react to temporally variable boundary conditions at the respective stopping point or can be adapted thereto.

In some embodiments, the stopping model may be trained or adapted over time by using observation data or training data in order to train or adapt the stopping model. One embodiment provides for the stopping model to be at least partially trained or adapted by virtue of the fact that a driving operational state of the motor vehicle is respectively detected in the motor vehicle, during at least one earlier journey, for at least one potential stopping point, upon reaching the respective stopping point. In this case, the driving operational state distinguishes between the stopping of the motor vehicle at the stopping point and a passage of the motor vehicle at the stopping point.

Passage means that the motor vehicle need not stop but rather remains in motion. A current switching state of a traffic light is determined or observed (stop=red, passage=green), for example, by means of the driving operational state. The stopping model is then trained or adapted on the basis of the detected driving operational state. If the stopping of the motor vehicle is detected in these embodiments, the stopping probability is increased as a result in the stopping model. If a passage is detected, the stopping probability is accordingly reduced in the stopping model.

Such embodiments may be advantageous, in particular, for a motor vehicle which is used by a commuter on a commute, that is to say on a route which is traveled on regularly or repeatedly. The motor vehicle then "learns" the stopping behavior along the commute. The stopping model can be locally trained or adapted in that only observation data from the motor vehicle itself have to be used. In some embodiments, it is also possible to dispense with the use of a camera and image processing connected downstream of the latter since only the driving operational state of the motor vehicle has to be observed. A current switching state of a traffic light, for example, can also naturally be determined on the basis of image data from a camera.

In some embodiments, there is a driving operational state determined at a stopping point and was determined in a traffic jam situation to be rejected. As a result, the stopping model is trained or adapted more effectively since the exception "traffic jam situation" does not distort or impair the procedure of adapting or training the stopping model. A traffic jam situation can be detected from a stop-and-go driving behavior of the motor vehicle and/or on the basis of said traffic information.

In some embodiments, the stopping model may be at least partially trained or adapted by virtue of the fact that the control device is coupled to at least one data source outside the vehicle and receives model data relating to a respective stopping model from at least one other motor vehicle from the at least one data source and/or receives model data relating to an overall model from a server and adapts or configures the stopping model using the received model data. The server may be an Internet server. The control device of the motor vehicle is therefore coupled to the server and/or to at least one other motor vehicle, for example via a radio connection, and respectively receives model data. The stopping model of the motor vehicle can therefore be improved or expanded, for example, on the basis of a stopping model of another motor vehicle. Model data relating to the overall model, in which the observation data or training data from a plurality of motor vehicles are combined, can be received from the server. This embodiment has the advantage that the stopping model in the motor vehicle can also be trained or adapted for those routes which have not yet been traveled on by the motor vehicle itself or at least have been rarely traveled on.

In some embodiments, the at least one operating measure may comprise operating a drive train of the motor vehicle in a coasting mode (coasting with the engine disengaged) and/or a drag mode (coasting with the engine engaged) and/or a recuperation mode (conversion of the kinetic energy of the motor vehicle into electrical energy). In some embodiments, the at least one operating measure may comprise switching off an internal combustion engine of the motor vehicle. A further possible operating measure is the targeted control of auxiliary consumers of the vehicle electrical system during the expected stopping procedure.

In some embodiments, the power of at least one electrified auxiliary consumer can be increased and/or the power of at least one non-electrified auxiliary consumer can be reduced (for example by the belt drive on the internal combustion engine). The at least one operating measure has the advantage that the fuel consumption of the motor vehicle is reduced in comparison with a process of approaching the stopping point with propulsion of the motor vehicle by the internal combustion engine and subsequent braking by means of a friction brake. The energy balance of the motor vehicle is generally improved by the at least one operating measure. Each operating measure generally provides for the operating mode of the motor vehicle to be changed by triggering the operating measure. In particular, provision is made for at least one operating measure to be carried out for the purpose of increasing the efficiency and/or enhancing the comfort and/or reducing emissions and/or increasing safety (for example early activation of a brake light).

In some embodiments, a confidence value may be determined in addition to the probability value itself by means of the stopping model. The confidence value indicates a degree of correspondence between the stopping model and a current driving situation. The at least one operating measure is initiated only if the confidence value is in a predetermined confidence range. The stopping model therefore indicates not only a probability value of how probable a stopping procedure is, but rather the confidence value also expresses whether the stopping model is actually suitably configured for the current traffic situation. If, for example, the probability value is determined by means of the stopping model on the basis of a current traffic situation, the confidence value can express how many items of statistical data or observations have actually already been collected in the stopping model for the current traffic situation, that is to say the scope of the training data with respect to the current traffic situation and/or time of day. The confidence value can therefore indicate the scope or volume of training data taken into account in the stopping model. The confidence value therefore expresses the reliability of the statistical basis, on which the stopping model is formed. These embodiments provide that a stopping model which is unreliable for the current driving situation cannot result in the triggering of the at least one operating measure.

In some embodiments, a duration value may be additionally determined for the respective stopping procedure by means of the stopping model, which duration value indicates how long the motor vehicle will presumably still be at a standstill during the stopping procedure. At least one predetermined starting measure is then started by the control device on the basis of the duration value. In the case of a stopping point with a traffic light, the duration value can indicate, for example, how long the current red phase, which has forced the motor vehicle to perform the stopping procedure, will still last. A starting measure prepares the starting procedure of the motor vehicle.

In some embodiments, the starting measure provides for a drive power may be available in the motor vehicle for the starting procedure, which drive power is greater than a predetermined minimum value. In some embodiments, the at least one starting measure may comprise starting a switched-off internal combustion engine of the motor vehicle. The internal combustion engine is therefore already started before the starting procedure is ended.

It has hitherto been assumed that the at least one potential stopping point is known. For example, a potential stopping point can be stored or mapped in a digital road map. For example, the respective position of at least one traffic light can be stored in such a digital road map. However, there may also be stopping points which initially are not discernible or mapped in a road map. One embodiment therefore provides for at least one potential stopping point during at least one earlier journey of the motor vehicle itself and/or of at least one other motor vehicle to be respectively determined where the respective motor vehicle has already carried out at least a predetermined minimum number of stopping procedures. In other words, at least one stopping point is defined by virtue of the fact that at least one motor vehicle has already observed or carried out a predetermined minimum number of stopping procedures there. As a result, relevant stopping points are detected in an automated manner by means of the method. This is also possible when a traffic light and/or a stop sign, for example, is/are not installed there.

Some embodiments include a control device for a motor vehicle including a computing device configured to carry out an embodiment of the methods described herein. The computing device may be based on a microprocessor or a microcontroller. A program code which carries out the method steps of the method during execution by the computing device can be provided for the computing device. The control device may be in the form of a control unit for the motor vehicle or a group of a plurality of control units or an Internet server. As the server, the control device can be coupled to the motor vehicle via a radio connection.

Some embodiments comprise a motor vehicle having an embodiment of the control device as described herein. The motor vehicle may be, for example, in the form of an automobile, that is to say a passenger vehicle or a truck, for example.

In the exemplary embodiment described in the following, the described components of the embodiment each represent individual features of the teachings herein that should be considered independently of one another, and that each also develop the teachings independently of one another and can therefore also be considered to be part of the disclosure, either individually or in a combination other than that shown. Furthermore, the embodiment described may also be supplemented by further features of the teachings from among those which have already been described. In the figures, functionally identical elements are respectively provided with the same reference signs.

FIG. 1 shows a motor vehicle 10. The motor vehicle 10 may be, for example, a passenger vehicle or a truck. The motor vehicle 10 may have a control device 11 which can control an internal combustion engine 12 of the motor vehicle 10, for example, to the effect that it can switch off and/or start the internal combustion engine 12 with a control signal 13. The control device 11 can also be coupled to at least one vehicle component 14, via which the control device 11 can determine, for example, a current driving operational state 15 of the motor vehicle 10 and/or can find out or retrieve a current route 16 of the motor vehicle 10. The route 16 may be estimated or planned.

The at least one vehicle component 14 may comprise, for example, a navigation system and/or an engine control unit of the motor vehicle 10. The control device 11 can also be coupled to a communication device 17 of the motor vehicle 10. The communication device 17 may comprise, for example, a mobile radio module (for example 4G or 5G or UMTS) and/or a WLAN radio module (WLAN—wireless local area network). The control device 11 can be coupled to a server 20, for example an Internet server, by means of the communication device 17 via a radio connection 18 and a mobile radio network 19, for example. A server may be a computer or a computer network. The server 20 is therefore a data source in the sense of the invention.

The control device 11 may manage a stopping model 21. The stopping model 21 may be, for example, a digital model which is managed on the basis of or by means of a computing device 22 of the control device 11. The stopping model 21 is a statistical model, in particular. The control device 11 may provide, for example, a control unit of the motor vehicle 10 or a group of a plurality of control units of the motor vehicle 10.

Figure 2:
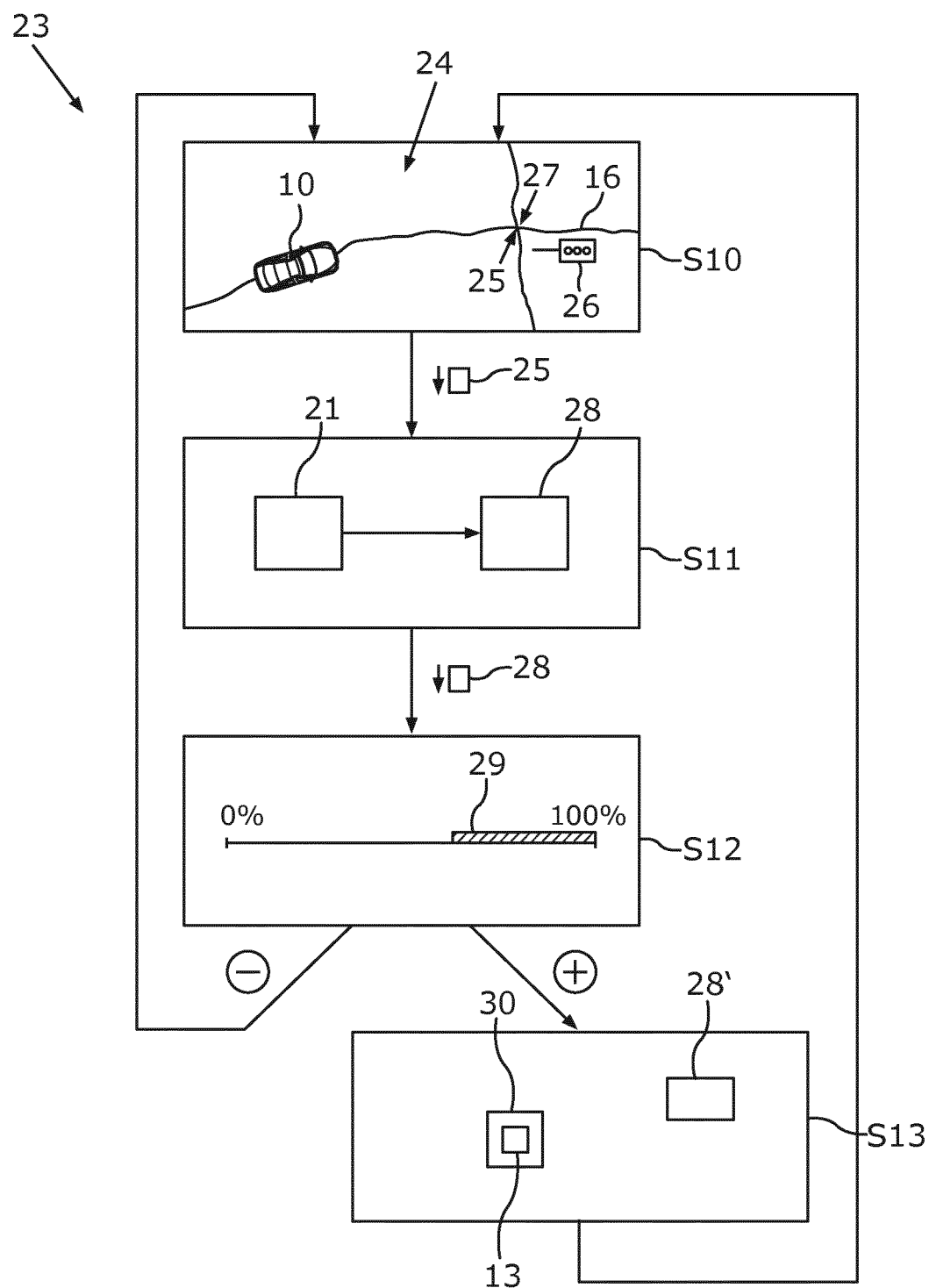
FIG. 2 shows a flowchart for one embodiment of a method incorporating teachings of the present disclosure.

FIG. 2 illustrates how a method 23 can be performed or carried out by the control device 11 on the basis of the stopping model 21, on the basis of which method the internal combustion engine 12 of the motor vehicle 10 can be switched, for example, in order to make operation of the motor vehicle 10 more efficient than without the control.

In a step S10, the method 23 provides for an upcoming potential stopping point 25, at which a stopping procedure of the motor vehicle 10 can result, to be detected, for example, along the route 16 on the basis of a digital road map 24. For example, the stopping point 25 may have a traffic light 26, at which the motor vehicle 10 would have to stop during a red phase of the traffic light 26. The traffic light 26 may be at an intersection 27.

In a step S11, the control device 11 can determine a probability value 28 for the stopping point 25 by means of the stopping model 21, which probability value indicates how high the probability is of a stopping procedure actually arising at the stopping point 25.

In this case, the stopping model provides for the probability value 28 to be a probability indication, that is to say to also be able to have intermediate values between 0% and 100%. In a step S12, the control device 11 can check whether the probability value is in a predetermined range of values 29, for which it is assumed that this means that the stopping procedure actually occurs at the stopping point 25.

In some embodiments, a stopping procedure is stopping of the motor vehicle to a driving speed of 0 km/h. In particular, the stopping procedure comprises a stop of more than 5 seconds, e.g., more than 10 seconds.

If the probability value 28 is outside the range of values 29 (symbolized in FIG. 2 by a "−" sign), it is possible to return to step S10 and to determine a further potential stopping point. If it is detected in step S12 that the probability value 28 is within the range of values 29 (symbolized in FIG. 2 by a "+" sign), a predetermined operating measure 30 can be triggered by the control device 11 in a step S13. The operating measure 30 may comprise, for example, generating the control signal 13 for switching off the internal combustion engine 12. After triggering the operating measure, it is possible to return to step S10 again and to determine a further potential stopping point.

Provision may be optionally made for the stopping model 21 to also output, in addition to the probability value 28, a confidence value 28' which indicates the degree or extent to which the probability value 28 correctly describes the current driving situation. For example, for a probability distribution stored in the stopping model, it is possible to determine how large its data base is. The size of the data base can then be described by the confidence value 28'. If the confidence value 28' is not above a predetermined threshold value, provision may be made for the at least one operating measure 30 to be omitted.

Figure 3:
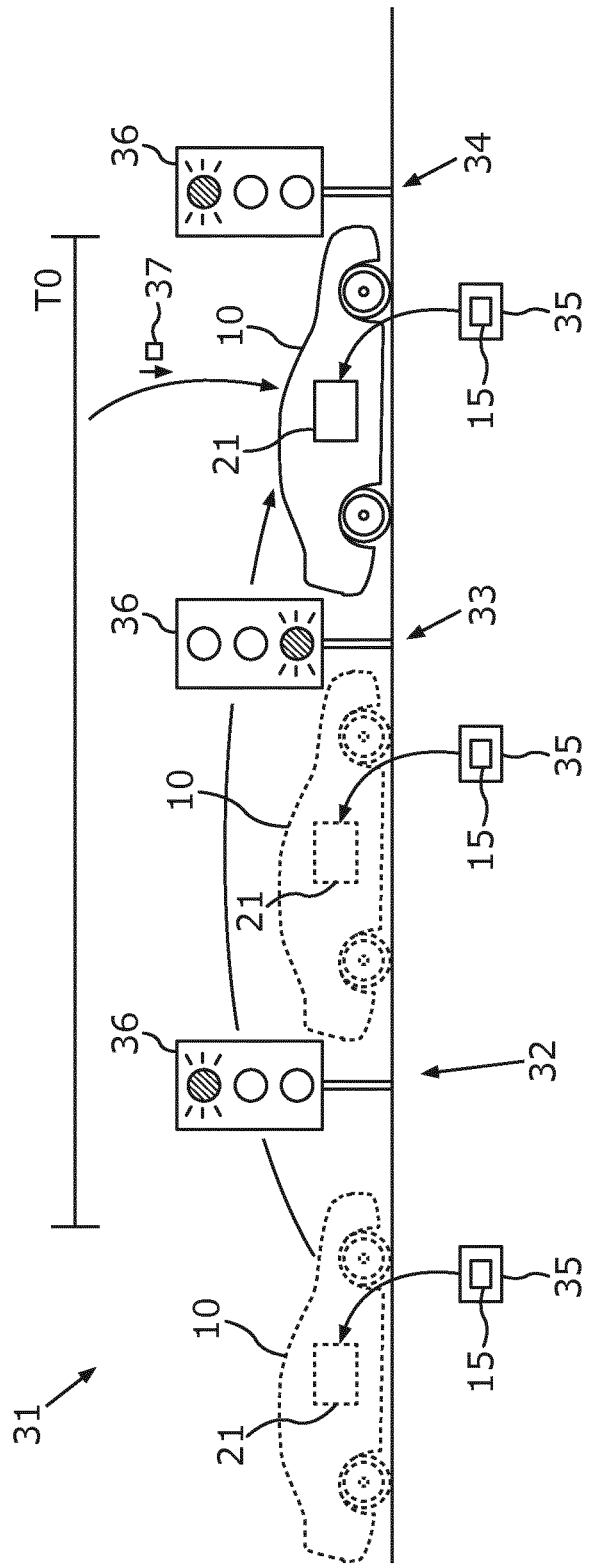
FIG. 3 shows an outline for illustrating one embodiment of a method incorporating teachings of the present disclosure, in which training data for configuring a stopping model are captured.

FIG. 3 illustrates how the stopping model 21 can be configured or trained. FIG. 3 shows the motor vehicle 10 during an earlier journey 31 which took place before the journey on which the description of the method 23 from FIG. 2 is based.

During the journey 31, the motor vehicle 10 can pass a plurality of potential stopping points 32, 33, 34, at each of which the control device 11 can determine observation data or training data 35 which indicate the driving state 15 at the respective potential stopping point 32, 33, 34. For example, a traffic light 36 may be respectively situated at the respective stopping points 32, 33, 34. Instead of a traffic light 36, however, a stop sign or an entrance, for example, can also trigger or cause a potential stopping procedure.

FIG. 3 illustrates how a traffic light 36 in a red phase causes a stopping procedure at the stopping point 32. The training data 35 accordingly describe a driving state 15 in which the motor vehicle 10 stops. These training data 35 can therefore be used for the stopping point 32 in the stopping model 21 in order to increase the probability of a stopping procedure at the stopping point 32, with the result that the probability value 28 is higher during a future journey of the motor vehicle 10 in the direction of the stopping point 32. At the stopping point 33, it is assumed that a traffic light 36 is switched to a green phase there.

On the basis of the training data 35, the control device 11 can detect that the driving state of the motor vehicle 10 signals a passage without stopping at the stopping point 33. The stopping model 21 can therefore be adapted or configured for the stopping point 33 to the effect that the probability value 28 is lower for a future journey past the stopping point 33. A traffic light 36 in the red phase is again assumed at the stopping point 34. Here, the stopping model 21 can be accordingly configured again on the basis of the training data 25. The stopping model 21 can additionally have further input parameters. For example, the stopping model 21 may have the observation of a reference event 37 as an input parameter.

For example, provision may be made for starting at the stopping point 32, that is to say a switching of the traffic light 36 to green at the stopping point 32, to be taken as a basis as a reference event 37 for the stopping point 34 and for the probability value 28 for the stopping point 34 to be determined on the basis of a driving time T0 from the stopping point 32 to the stopping point 34 in the stopping model 21. In other words, the stopping model 21 assumes that a reference event 37 is observed at the stopping point 32 or generally at a previous stopping point, for example starting after switching to a green phase at a traffic light 36, and the probability value 28 is then determined for a subsequent stopping point 34 on the basis of how long ago the motor vehicle 10 was started at the previous starting point, that is to say how long the vehicle T0 was. This makes it possible to model, for example, a so-called green wave which results along a plurality of traffic lights 36. Therefore, there is no need for any synchronization of the stopping model 21 with the traffic light 36 at the stopping point 34 itself, but rather the synchronization is effected by observing a reference event 37 at a previous stopping point 32 or 33.

Figure 4:
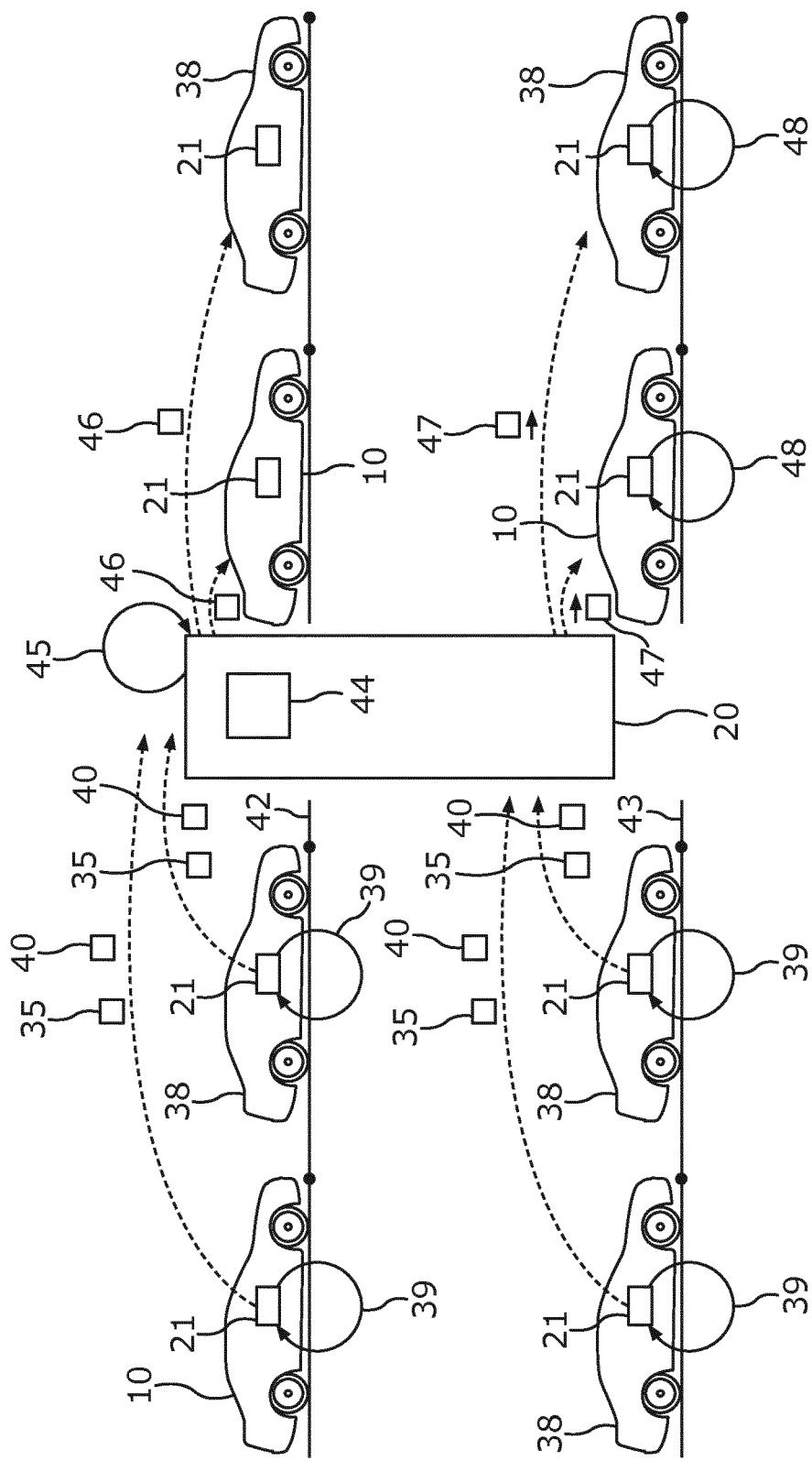
FIG. 4 shows an outline for illustrating one embodiment of a method incorporating teachings of the present disclosure, in which a server determines an overall model for a plurality of motor vehicles.

FIG. 4 illustrates how, in addition to the motor vehicle 10, further motor vehicles 38 can each update or train a local stopping model 21 in an update or training 39, as described using FIG. 3. Each of the motor vehicles 10, 38 can then transmit or transfer or send the training data 35 and/or model data 40, which describe the current stopping model 21 itself, to the server 20 by means of a respective communication device 17 (see FIG. 1). In this case, the motor vehicles 10, 38 can drive on different routes 41, 42. The server 20 can form an overall model 44 which can represent a stopping model for all routes 42, 43. The overall model 44 can be updated or configured in an update or training 45, like a local stopping model in one of the motor vehicles 10, 38, on the basis of the training data 35 and/or model data 40.

Forecast data 46, for example, can be sent from the overall model 44 to the motor vehicles 10, 38 on the basis of the global model 44, with the result that a forecast or a prediction of a stopping procedure can be carried out by the server 20 itself for each motor vehicle 10, 38. The forecast data 46 may indicate a respective probability value 28, for example. As an alternative, model data 47 relating to the overall model 44 can be transmitted to the motor vehicles 10, 38. The stopping models 21 in the motor vehicles 10, 38 can be updated or adapted on the basis of the model data 47. A local forecast 48, as described in connection with FIG. 2 (step S11), is then respectively possible in each motor vehicle 10, 38 independently of the server 20.

Figure 5:
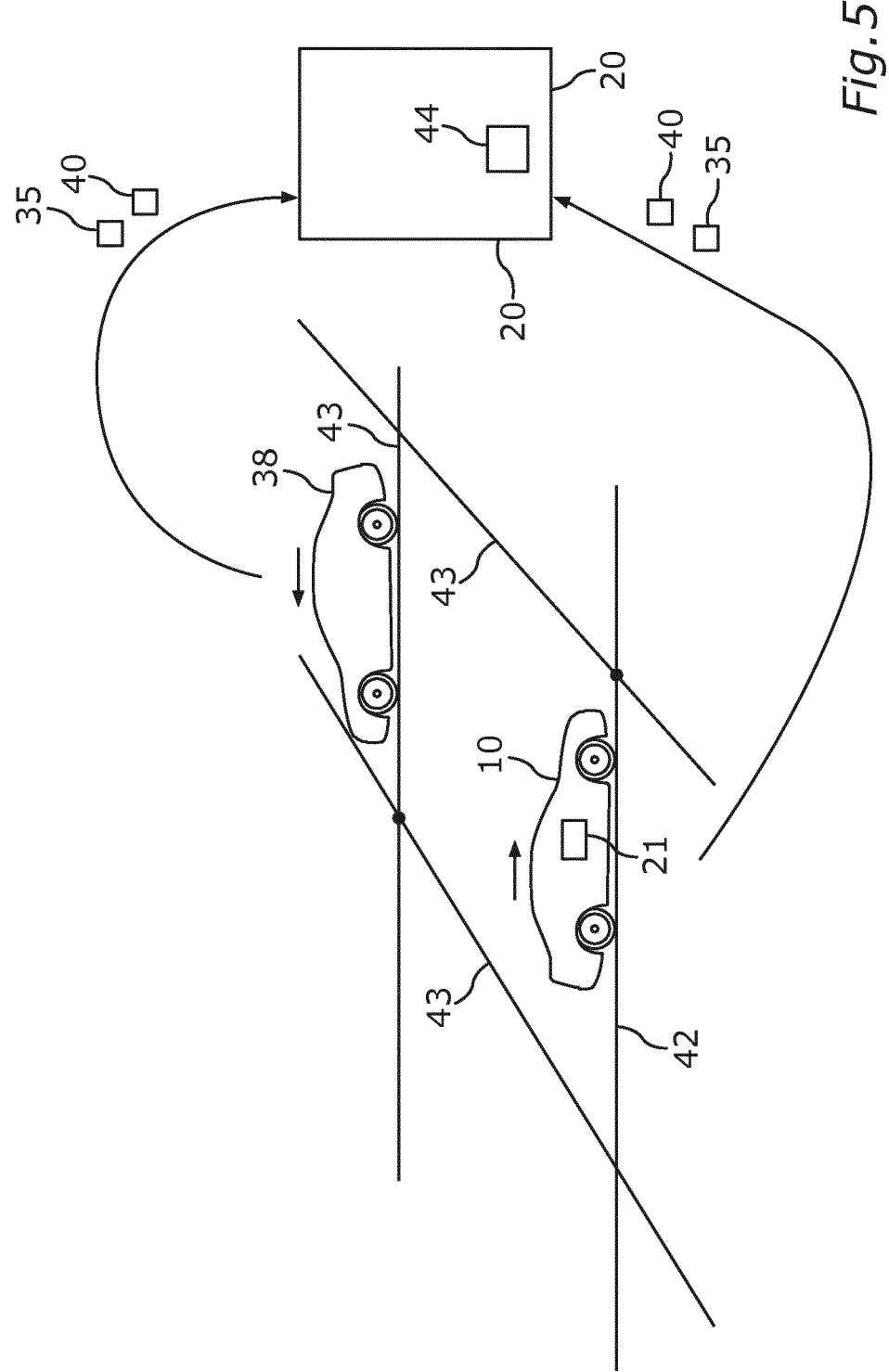
FIG. 5 shows an outline for further illustrating the method according to FIG. 4.

FIG. 5 illustrates again how the motor vehicle 10 can also receive a stopping model 21 in which those roads 43 which have never been traveled on by the motor vehicle 10 are taken into account. FIG. 5 assumes that the motor vehicle 10 has only traveled on the road 42 of the illustrated roads 42, 43. By virtue of the fact that the motor vehicle 10 and the other motor vehicles 38 (only one motor vehicle 38 is illustrated, for example, in FIG. 5) transmit their training data 35 and/or model data 40 to the server 20, the server 20 can combine the information relating to all roads 42, 43.

Figure 6:
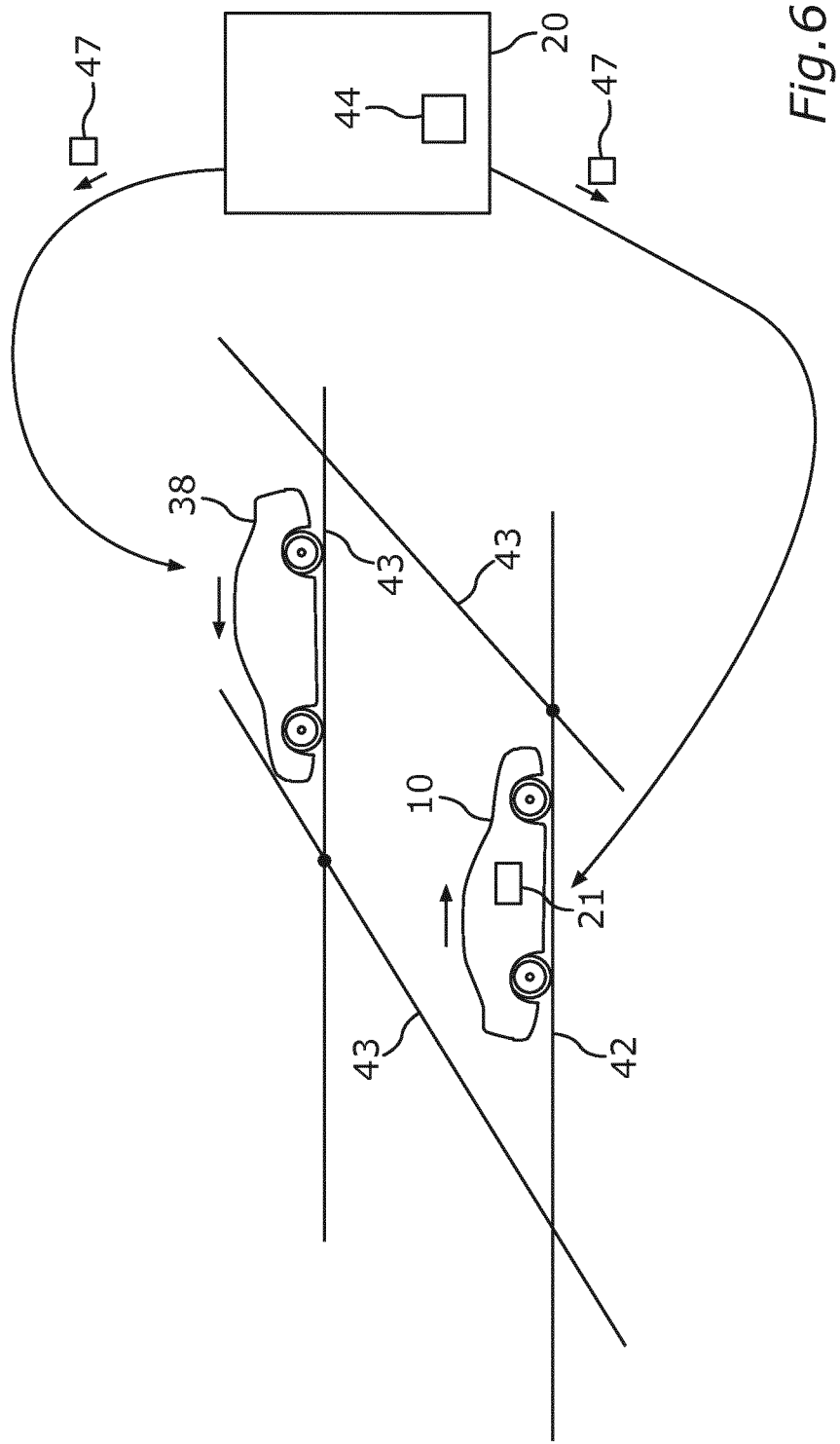
FIG. 6 shows an outline for illustrating one embodiment of a method incorporating teachings of the present disclosure, in which stopping procedures are forecast.

FIG. 6 finally illustrates how the motor vehicle 10 is supplied with those model data 47 which also describe the roads 43 by virtue of the model data 47 relating to the model 44 being sent to the motor vehicles 10, 38. The stopping model 21 of the motor vehicle 10 can therefore also generate a probability value 28 (see FIG. 2) in step S11 when the motor vehicle 10 drives on the corresponding road 43 for the first time.

An embedded learning system in the vehicle is therefore involved overall, which learning system predicts traffic light phases, for example, for a vehicle moving toward a traffic light (local system). A plurality of learning systems of different vehicles can be linked via a back-end server or server for short (global system), with the result that the forecast availability and quality can be increased. The traffic light forecast can be used to influence the drive train during stopping procedures in such a manner that a fuel consumption which is as low as possible is produced, that is to say the coasting and recuperation phases are controlled in such a manner that the vehicle comes to a standstill with a fuel consumption which is as low as possible. For this purpose, the stopping procedures must be initiated in good time (assuming that the driver cooperates), which in turn is possible only with a forecast of the traffic light phase. Furthermore, starting can be improved if it is known how long the vehicle is at a standstill or when it can continue driving. The engine start and starting procedure can therefore be initiated in good time.

In contrast to solutions which require information from the infrastructure, the proposed concepts are based minimally on a solution implemented in the vehicle (local system) and at most it is possible to resort to a global solution with a server as a basis for data collection and knowledge generation in the sense of a forecast.

In some embodiments, the system (that is to say the control device or the combination of control devices and server) does not learn the absolute time of a traffic light phase (for example traffic light phase on Mondays at 08:15:35), but rather learns the expected traffic light phase on the basis of the previous traffic light phases and a reference event observed there (see FIG. 3). For example, it is learnt, in the case of a series of traffic lights A, B, C, what the traffic light phase is like at the subsequent traffic lights B and C which follow the traffic light A along a route. In a simplified manner, the system learns the red and green waves and stores how long it is necessary to stop for at the red traffic lights. The information regarding whether there was a stop at the previous traffic lights and how long the driving time T0 was between the traffic lights A and B or A and C is therefore needed for training and forecasting.

In some embodiments, the forecast system can be trained continuously, that is to say can be supplied continuously with the training data. For this purpose, it must detect whether it is driving toward an intersection and whether the vehicle must stop. A stopping probability can be calculated therefrom. In this case, reference points are a map with depicted traffic light systems and also stop signs. A lane-accurate GPS/localization can be used since each direction can have its own signaling. The stops and associated traffic light colors cannot necessarily only be detected using a camera and presuppose such a camera (traffic light color detected), but rather can also be captured more easily, for example on the basis of the driving operational state. Not only red traffic lights, but also green traffic lights, can therefore be learnt.

In this case, not only the class of light signals as potential stopping points is important for said power train functions, for example, but rather the stopping and starting probability at a particular position in general. Current dynamic traffic information is useful for checking the plausibility. For example, the training data in traffic jam situations can be rejected. If a vehicle-based solution (on-board/local) is preferred, the route must be traveled on often enough. The advantage here is that there is no need to find a server-based or transmitter-based solution. In addition, there is no need for networking to the traffic infrastructure (traffic lights, traffic control computers, . . . ). The disadvantage of the local forecast is the restriction of the forecast to routes which are driven on again and again.

Networking the vehicles to a server makes it possible to link the individual local vehicle-based solutions in the server and therefore to provide a global forecast for all routes. The more vehicles supply training data, the better the forecast. Movement data of vehicles can also be used for this purpose. With a sufficient range of data, schedule changes of traffic lights can also be captured. In the backend, on account of the large available volume of data, different forecast models can be trained on the basis of the traffic flow or the time (time of day, day of the week) and can be used. A further advantage of the global forecast is that the forecast can also be provided for vehicles which have not yet created a local forecast model or for vehicles, for example rental vehicles, which are not moved on routes which are repeatedly traveled on. A further advantage of the invention is that stopping probabilities are generally calculated and not only restricted forecasts for traffic light systems. Overall, the example shows how the teachings herein can provide a local and expandable stopping forecast system.

LIST OF REFERENCE SIGNS

10 Motor vehicle
11 Control device
12 Internal combustion engine
13 Control signal
14 Vehicle component
15 Driving state
16 Route
17 Communication device
18 Radio connection
19 Mobile radio network
20 Server
21 Stopping model
22 Computation device
23 Method
24 Digital road map
25 Stopping point
26 Traffic light
27 Intersection
28 Probability value
29 Range of values
30 Operating measure
31 Earlier journey
32 Stopping point
33 Stopping point
34 Stopping point
35 Training data
36 Traffic light
37 Reference event
38 Further motor vehicle
39 Local training
40 Model data
41 Route
42 Road
44 Overall model
45 Training
46 Forecast data
47 Model data
48 Local forecast
T0 Driving time
S10-S13 Method step

What is claimed is:

1. A method for operating a motor vehicle during a journey along a route, the method comprising:
   determining an upcoming potential stopping point along the route;
   upon approach to the potential stopping point, calculating a value for a probability of a stopping procedure of the motor vehicle at the stopping point at least in part on a stopping model;
   wherein the stopping model includes a statistical model providing intermediate values between 0% and 100% for the probability value;
   if the probability value is in a predetermined range of values defining a likely occurrence of the stopping procedure, triggering a predetermined operating measure to adapt operation of the motor vehicle to the stopping procedure;
   training the stopping model in a driving operational state distinguishing between a stop and a passage through a potential stopping point by detecting a potential stopping point during an earlier journey and, upon reaching the potential stopping point on the basis of the driving operational state;
   determining that a driving operational state at a potential stopping point was de to rmine d in a traffic jam situation; and
   rejecting the driving operational state for training the stopping model;
   wherein the operating measure comprises at least one measure selected from the group consisting of: converting a drive train of the motor vehicle into a coasting mode, a drag mode, and/or a recuperation mode; and switching off an internal combustion engine of the motor vehicle.

2. The method as claimed in claim 1, wherein the potential stopping point comprises at least one feature selected from the group consisting of: an intersection with right-of-way control, a traffic circle, a stop sign, a traffic light, an on-ramp, a barrier, and a parking garage entrance.

3. The method as claimed in claim 1, further comprising:
   detecting at least one reference event preceding the stopping point; and
   adjusting the probability value on the basis of the at least one reference event.

4. The method as claimed in claim 3, wherein the at least one reference event comprises a starting procedure at an earlier stopping point with a traffic light.

5. The method as claimed in claim 1, wherein determining the probability value includes adjusting the probability value using at least one factor selected from the group consisting of: traffic information, a respective indication of a time of day, a day of the week, a season, and a schedule change of a traffic light.

6. The method as claimed in claim 1, further comprising:
training the stopping model by coupling to a data source outside the motor vehicle;
receiving model data from another motor vehicle through the data source; and
adjusting the stopping model using the received model data.

7. The method as claimed in claim 1, further comprising calculating a confidence value using the stopping model;
wherein the confidence value indicates a degree of correspondence between the stopping model and a current driving situation; and
the operating measure is initiated only if the confidence value falls within a predetermined confidence range.

8. The method as claimed in claim 1, further comprising determining a duration value for the stopping procedure using the stopping model;
wherein the duration value indicates how long the motor vehicle will presumably be at a standstill during the stopping procedure; and
a starting measure is started by the control device on the basis of the duration value.

9. The method as claimed in claim 8, wherein the starting measure comprises starting a switched-off internal combustion engine of the motor vehicle.

10. The method as claimed in claim 1, further comprising determining an upcoming potential stopping point from an earlier journey of the motor vehicle where the motor vehicle has already carried out a predetermined minimum number of stopping procedures.

11. A control device for a motor vehicle, the control device comprising:
a computing device with a processor and a memory;
the memory storing a set of instructions, the set of instructions, when loaded and executed by the processor, causing the computing device to:
determine an upcoming potential stopping point along the route;
upon approach to the potential stopping point, calculate a value for a probability of a stopping procedure of the motor vehicle at the stopping point at least in part on a stopping model;
wherein the stopping model includes a statistical model providing intermediate values between 0% and 100% for the probability value;
if the probability value is in a predetermined range of values defining a likely occurrence of the stopping procedure, trigger a predetermined operating measure to adapt operation of the motor vehicle to the stopping procedure;
training the stopping model in a driving operational state distinguishing between a stop and a passage through a potential stopping point by detecting a potential stopping point during an earlier journey and, upon reaching the potential stopping point on the basis of the driving operational state;
determining that a driving operational state at a potential stopping point was determined in a traffic jam situation; and
rejecting the driving operational state for training the stopping model;
wherein the operating measure comprises at least one measure selected from the group consisting of: converting a drive train of the motor vehicle into a coasting mode, a drag mode, and/or a recuperation mode; and switching off an internal combustion engine of the motor vehicle.

12. A method for operating a motor vehicle during a journey along a route, the method comprising:
determining an upcoming potential stopping point along the route;
upon approach to the potential stopping point, calculating a value for a probability of a stopping procedure of the motor vehicle at the stopping point at least in part on a stopping model;
wherein the stopping model includes a statistical model providing intermediate values between 0% and 100% for the probability value;
if the probability value is in a predetermined range of values defining a likely occurrence of the stopping procedure, triggering a predetermined operating measure to adapt operation of the motor vehicle to the stopping procedure;
calculating a confidence value using the stopping model;
wherein the confidence value indicates a degree of correspondence between the stopping model and a current driving situation; and
the predetermined operating measure is initiated only if the confidence value falls within a predetermined confidence range;
wherein the operating measure comprises at least one measure selected from the group consisting of: converting a drive train of the motor vehicle into a coasting mode, a drag mode, and/or a recuperation mode; and switching off an internal combustion engine of the motor vehicle.

13. The method as claimed in claim 12, wherein the potential stopping point comprises at least one feature selected from the group consisting of: an intersection with right-of-way control, a traffic circle, a stop sign, a traffic light, an on-ramp, a barrier, and a parking garage entrance.

14. The method as claimed in claim 12, further comprising:
detecting at least one reference event preceding the stopping point; and
adjusting the probability value on the basis of the at least one reference event.

15. The method as claimed in claim 14, wherein the at least one reference event comprises a starting procedure at an earlier stopping point with a traffic light.

16. The method as claimed in claim 12, wherein determining the probability value includes adjusting the probability value using at least one factor selected from the group consisting of: traffic information, a respective indication of a time of day, a day of the week, a season, and a schedule change of a traffic light.

17. The method as claimed in claim 12, further comprising:
training the stopping model by coupling to a data source outside the motor vehicle;
receiving model data from another motor vehicle through the data source; and
adjusting the stopping model using the received model data.

18. The method as claimed in claim 12, wherein the operating measure comprises at least one measure selected from the group consisting of: converting a drive train of the motor vehicle into a coasting mode, a drag mode, and/or a recuperation mode; and
switching off an internal combustion engine of the motor vehicle.

19. The method as claimed in claim 12, further comprising determining a duration value for the stopping procedure using the stopping model;

wherein the duration value indicates how long the motor vehicle will presumably be at a standstill during the stopping procedure; and a starting measure is started by the control device on the basis of the duration value.

20. The method as claimed in claim 19, wherein the starting measure comprises starting a switched-off internal combustion engine of the motor vehicle.

21. The method as claimed in claim 12, further comprising determining an upcoming potential stopping point from an earlier journey of the motor vehicle where the motor vehicle has already carried out a predetermined minimum number of stopping procedures.

* * * * *